June 27, 1939.  H. N. EKBOM ET AL  2,163,729
SWIVEL ROLLER CONSTRUCTION
Filed April 9, 1938   2 Sheets-Sheet 1
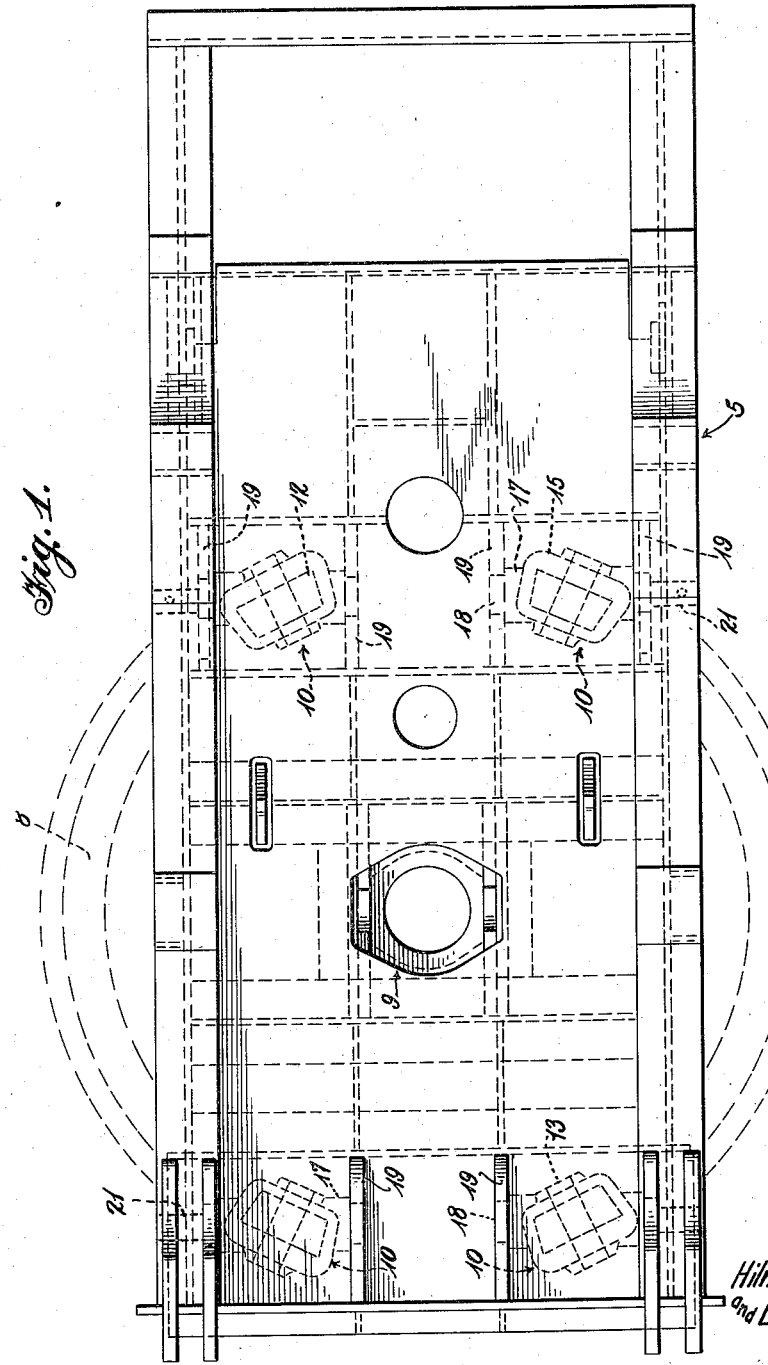

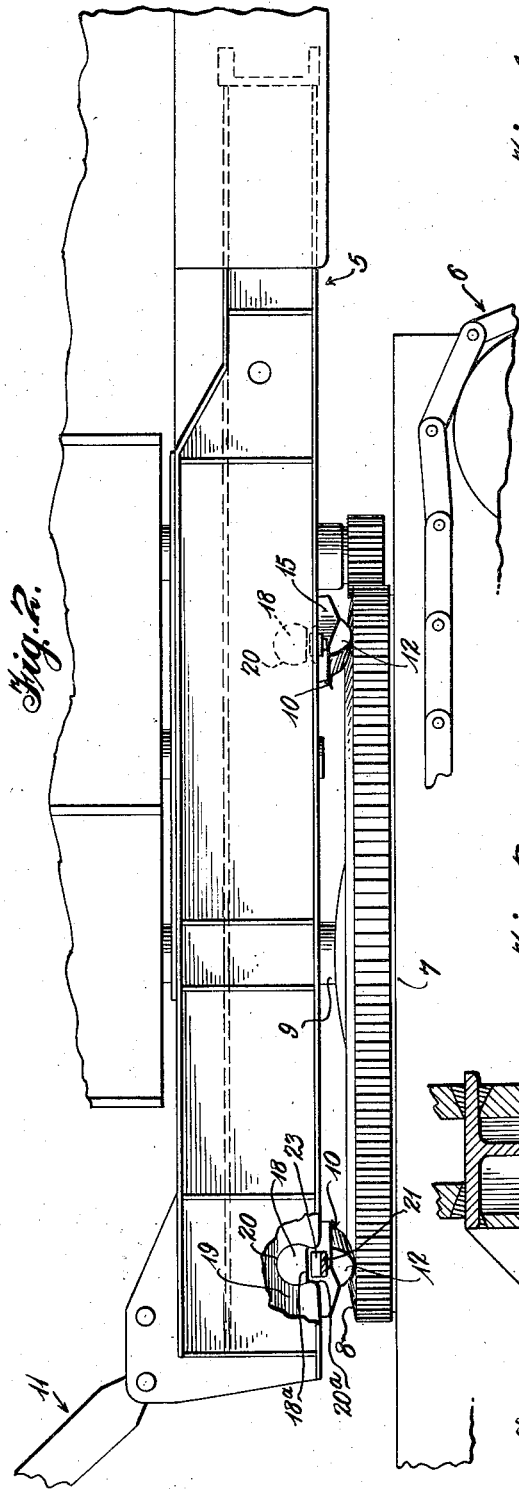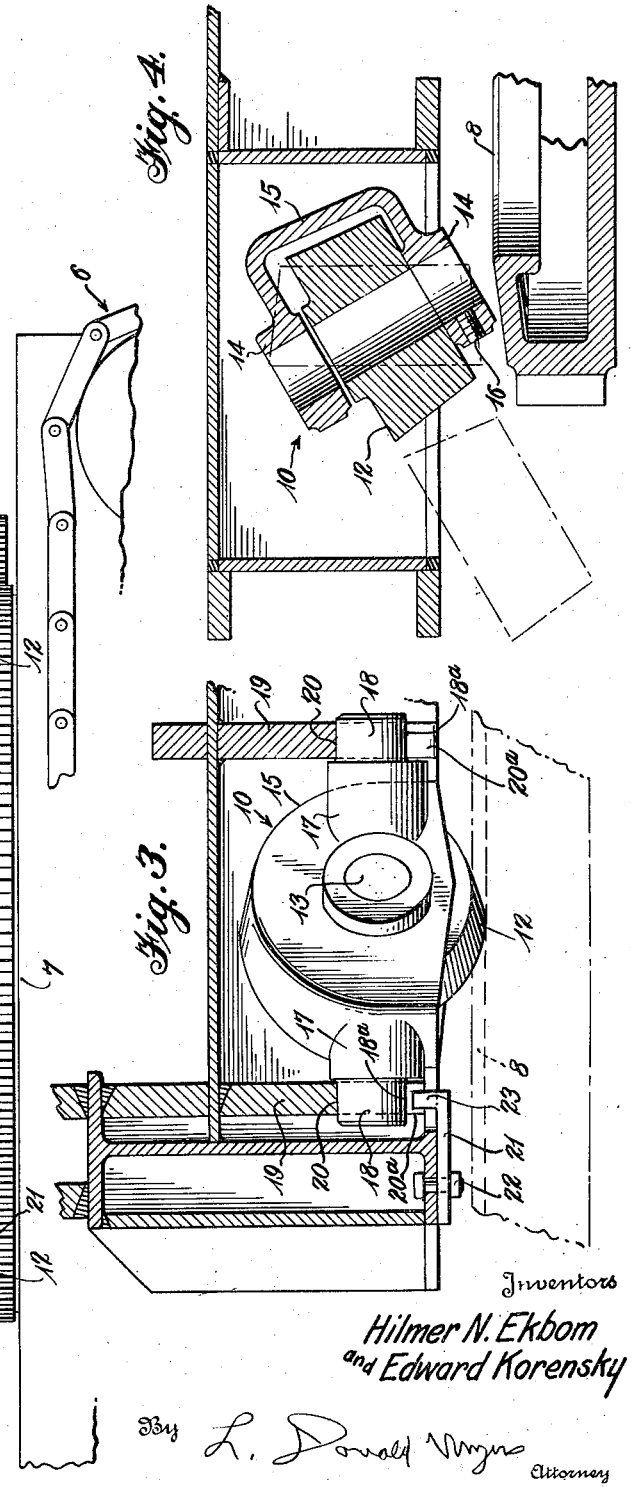

Patented June 27, 1939

2,163,729

UNITED STATES PATENT OFFICE 2,163,729

SWIVEL ROLLER CONSTRUCTION

Hilmer N. Ekbom and Edward Korensky, Chicago, Ill., assignors to Link-Belt Company, a corporation of Illinois Application April 9, 1938, Serial No. 201,191

19 Claims. (Cl. 308—226)

This invention relates to new and useful improvements in swivel roller construction for use in supporting the upper rotating structure of locomotive and crawler cranes, shovels, and the like.

It is a common practice in locomotive and crawler cranes, shovels, draglines, and the like, to mount the upper rotating structure on a roller circle or race, usually formed as a part of a ring gear which is secured to the frame of a car body, truck or other traction device. The rotating upper structure is centered with respect to the roller circle or race by means of a center pin which is generally secured to the frame of the car body, truck, or other traction device. The upper structure is intended to rotate with respect to the center pin. The vertical loads are generally transmitted from the upper rotating structure to the frame of the traction device by means of rollers which engage and travel on the roller circle or race.

The center of gravity of the upper rotating structure naturally shifts as loads are lifted and deposited by the load manipulating means mounted on the upper structure. If the loads are not sufficiently heavy to shift the center of gravity to a point outside of the roller circle or race, all of the rollers, which usually are arranged in front and rear pairs, will bear on the roller circle or race and will function to support the upper structure and its load. However, the roller circle or race generally is of such small diameter that the handling of even maximum rated loads effects movement of the center of gravity outside the roller circle or race with the result that the upper structure frequently rotates with its center of gravity so displaced. In order to avoid binding between certain parts of the assembly, it is necessary to allow for relative movement between the center pin parts and the rollers on the roller circle or race. This relative movement may be permitted by the provision of a certain amount of clearance or play or as a result of specific forms of connections employed between certain parts of the assembly. In any event, the upper structure is caused to tilt about either the front or rear pair of rollers as the handling of heavy loads causes shifting of the center of gravity.

Heretofore, it has been the general practice to employ conical rollers to avoid any sliding on the face of the roller circle or race and to mount the front and rear pairs of rollers in the frame of the upper structure or in separate roller brackets rigidly bolted to said frame so that the roller shafts are immovably held with their axes parallel with the plane of said frame. It will be appreciated that when the upper structure rotates in a tilted condition, the pair of rollers which remains in engagement with the roller circle or race will be heavily overloaded as the entire weight of the upper structure and its load as well as the center pin tension, must be borne thereby. These two rollers also will not be caused to bear evenly on the roller circle or race and the heavy load will be concentrated on the outer or greater diameter of the conical rollers and on the bearings for the outer ends of the roller shafts. This concentration of load will result in rapid or uneven wear of the outer roller edges and bearings.

It is the primary object of this invention to provide a swivel roller construction which will overcome all of the aforementioned disadvantages inherent in roller construction now commonly used in locomotive and crawler cranes, shovels, and the like.

A further important object of the invention is to provide a roller construction which will result in an even distribution of the load over the entire face of each roller, over the entire face of the roller circle or race, and between both bearings for each roller shaft when the upper structure is tilted as a result of displacement of the center of gravity outside the roller circle or race.

Still another object of the invention is to provide a type of mounting for rollers of the above mentioned type which will permit the rollers to swivel relative to the upper structure, which will protect the rollers from dirt falling from the floor or platform of the upper structure, and which will simplify the replacement and repair of the rollers and their mounting brackets.

Other objects and advantages of the invention will be apparent during the course of the following description.

In the accompanying drawings forming a part of this specification and in which like numerals are employed to designate like parts throughout the same, Figure 1 is a plan view of the platform or floor frame of an upper rotatable structure shown mounted on a roller circle or race, Figure 2 is a side elevational view of the structure illustrated in Fig. 1, Figure 3 is a detail vertical sectional view which discloses one of the swivel roller units embodying this invention and mounted in the frame of the upper structure, and Figure 4 is a vertical sectional view taken substantially at right angles to the disclosure of Fig. 3, and illustrates the manner in which the swivel roller unit may be manipulated to permit insertion and removal of a roller with respect to its mounting bracket.

In the drawings, wherein for the purpose of illustration is shown the preferred embodiment of this invention, the reference character 5 designates in its entirety the platform or floor frame of the upper rotatable structure. Fig. 2 discloses a fragmentary portion of a traction device, which in this particular illustration takes the form of a crawler or traveling tread unit. It is to be understood, however, that the upper rotatable structure 5 may be mounted on any form of traction device, such as a railway locomotive car body, a truck body, or the like. Suitably mounted on the traction device 6 is a ring gear 7 which is formed on its upper surface with a beveled roller circle or race 8. It is the usual practice to center the upper rotatable structure 5 with respect to the roller circle or race 8 by means of a center pin unit 9 and to support the upper rotatable structure on the roller circle or race 8 by means of front and rear pairs of roller units. Each roller unit in the several figures of the drawings is designated in its entirety by the reference character 10. The reference character 11 in Fig. 2 designates what is intended to represent a boom or mast of a load manipulating device which is carried by the upper rotatable structure 5.

Locomotive and crawler cranes, shovels, draglines, and the like, naturally, are intended to handle loads of widely varying weights. As these loads are picked up and deposited, the center of gravity for the upper rotatable structure naturally shifts longitudinally of the frame 5. When a sufficiently heavy load is being manipulated by the device 11, the center of gravity for the upper rotatable structure is shifted or displaced outside of the roller circle or race 8. In order to avoid binding at the center pin unit 9, it is customary to allow a certain amount of clearance or play which will permit the upper rotatable structure 5 to tilt relative to the center pin. When the upper structure tilts as a result of handling a heavy load, the frame or platform 5 moves about one or the other pair of rollers as a pivot. It is the common practice to rigidly secure the several rollers to the frame or platform of the upper rotatable structure so that the axes of the several rollers always remain parallel with the horizontal plane of the upper structure or more particularly, the frame or platform 5. This tilting of the frame or platform about a pair of fixed rollers as an axis or pivot, naturally, causes the rollers of the pair to pivot relative to the face of the roller circle or race 8. The entire weight of the upper rotatable structure and its load, therefore, is concentrated on the one pair of rollers and particularly on the edge portion of the ends of the rollers which are of larger diameter. This concentrated load, also, is centered on the outer edge portion of the roller circle or race and on the outer end of bearings for the roller shafts. Naturally, uneven and rapid wear of the roller peripheries, the face of the roller circle or race, and the outer bearings for the roller shafts results.

To overcome these disadvantages, the several rollers, in accordance with this invention, are connected to the frame or platform 5 of the upper rotatable structure by means of brackets which are pivotally connected or swiveled transversely to the said frame or platform. This novel form of mounting now will be described in detail by particularly referring to Figs. 1, 3, and 4.

It will be noted that each conical roller 12 is rotatably supported on a roller shaft 13. The opposite end portions of the shaft 13 are received in the apertures formed in bearing bosses 14 which are formed as an integral part of the opposite side walls of a bearing bracket housing 15. It will be noted, by particularly inspecting Figs. 1, 3 and 4, that this bracket housing 15 generally conforms in shape with the roller 12 and is hollowed out to receive and enclose all but a small peripheral portion of the roller. Fig. 4 discloses a set screw 16 which is employed for preventing removal of the roller shaft 13 with respect to the bearing bosses or enlargements 14 of the bracket housing 15.

Figs. 1 and 3 disclose the bracket housing 15 as having formed thereon diametrically arranged and axially aligned bosses 17. Projecting from the ends of the bosses 17 are the axially aligned trunnions 18, each one of which is formed with a flat side 18a. By inspecting Fig. 1, it will be seen that these trunnions have their axes arranged transversely with respect to the frame 5.

Figs. 1 and 3 disclose the frame or platform 5 of the upper rotatable structure as having provided therein the four pairs of web plates 19. These various web plates extend longitudinally of the frame or platform 5. Each web plate is provided with a bearing aperture 20 which journals one of the trunnions 18 of a roller bracket. Figs. 2 and 3 disclose the webs 19 as being cut away beneath the apertures 20 to form entrance openings 20a which are of less width than the diameter of the apertures 20, but are of slightly greater width than the minor diameter of the trunnions; i. e., the diameter resulting from the flat sides 18a. By turning the bracket housings 15 through an angle of 90° about the axes of their trunnions 18, it is possible to insert and withdraw the said trunnions 18 through the entrance openings 20a. When the trunnions 18 are properly located in the apertures 20, they may be retained therein by means of an angular lock plate 21 removably secured to the bottom of the frame 5 by means of a suitable fastening device 22. One of these lock plates is provided for each bracket housing. Each lock plate includes a head 23 which is arranged in the entrance opening 20a of its aperture 20 and is located to provide a desired amount of clearance relative to the flat side 18a of its associated trunnion. The lock plates, therefore, prevent the brackets from swiveling too far to the side in case there should be so great an amount of clearance in the center pin as to allow sufficient play between the face of the roller and the face of the roller circle or race to permit the bracket to swivel into its releasing position.

By inspecting Fig. 1, it will be seen that the several rollers 12 are arranged with their shaft axes radiating from the center or axis of the roller circle or race. The mounting brackets for the rollers are arranged with the axes for their trunnions 18 extending truly transversely of the length of the frame or platform 5. The axes for the trunnions of each pair of roller brackets are in alignment with each other. There is provided, therefore, a pair of rollers at the front portion and a second pair of rollers at the rear portion of the platform or frame 5 with the roller brackets for each pair mounted to swivel or pivot with respect to the platform or frame 5 about a common transverse axis.

With the roller brackets of each pair mounted in this manner, it will be apparent that the frame or platform 5 may tilt relative to its center pin and the roller circle or race about an axis which passes through both rollers of a pair and which coincides with the common axis for the trunnions of the brackets which mount this pair of rollers in the frame or platform. The said upper structure, therefore, can tilt or pivot about a pair of rollers without causing the rollers to pivot relative to the surface of the roller circle or race. When the upper structure tilts, the load will be concentrated on one pair of rollers, but the load will be borne uniformly by the entire peripheral surface of both of the rollers, the entire face of the roller circle or race, and both bearings for each roller shaft.

By inspecting Figs. 1, 3 and 4, it will be seen that the bracket housing 15 encloses its roller in a manner to completely protect the same against dirt, and other foreign matter which might drop onto the roller from the floor plate of the frame or platform 5. Fig. 4 also discloses the fact that the platform or frame 5 may be tilted relative to the roller circle or tread 8 in a manner to lift one pair of rollers from the face of the said circle or race. When this pair of rollers is lifted out of contact with the roller circle or race, the brackets for the freed rollers may be pivoted or swiveled in a manner to permit their rollers to be withdrawn from the bracket housings in a direction radially of the roller circle or race. Of course, this removal of the rollers only takes place after freeing and withdrawing the roller shafts. It is possible, therefore, to readily remove damaged or worn rollers and substitute new ones.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. A roller construction for locomotive and crawler cranes, shovels, and the like, comprising a traction device having a roller circle or race associated therewith, an upper rotatable structure, having a load manipulating device mounted on one end portion thereof, centered with respect to the roller circle or race, rollers for supporting the upper structure on the said circle or race, and means for connecting two of said rollers to the upper structure at the end portion having said device so as to permit the rollers to swivel relative to the upper structure about a common axis extending transversely of the upper structure in response to tilting of the upper structure as a result of load manipulation.

2. A roller construction for locomotive and crawler cranes, shovels, and the like, comprising a truck frame having a roller circle or race associated therewith, an upper rotatable structure centered with respect to the roller circle or race, rollers for supporting the upper structure on said circle or race, a separate bracket for mounting each of the rollers and its shaft, and means for connecting the brackets to the upper structure to permit all of the brackets to swivel about either one of two axes extending transversely of the upper structure to vary the angular relationship of the roller axes relative to the horizontal plane of the upper structure.

3. A roller construction for locomotive and crawler cranes, shovels, and the like, comprising a truck frame having a roller circle or race associated therewith, an upper rotatable structure centered with respect to the roller circle or race, front and rear pairs of rollers for supporting the upper structure on the said circle or race, a shaft for each roller, and means for mounting each pair of rollers and their shafts for bodily movement relative to the upper structure about a common axis extending transversely of the upper structure.

4. A roller construction for locomotive and crawler cranes, shovels, and the like, comprising a truck frame having a roller circle or race associated therewith, an upper rotatable structure centered with respect to the roller circle or race, front and rear pairs of rollers for supporting the upper structure on said circle or race, a shaft for each roller, a bracket for each roller and its shaft, and means for connecting the brackets to said upper structure in such a manner that the rollers of each pair and their shafts and brackets may swivel as a unit about a common axis.

5. A roller construction for locomotive and crawler cranes, shovels, and the like, comprising a truck frame having a roller circle or race associated therewith, an upper rotatable structure centered with respect to the roller circle or race, front and rear pairs of rollers for supporting the upper structure on the roller circle or race, and means for connecting each pair of rollers to the upper structure in a manner to permit the upper structure to tilt about an axis passing through both rollers of one of said pairs while the rollers of said pair remain in full face contact with the roller circle or race.

6. A roller construction for locomotive or crawler cranes, shovels, and the like, comprising a truck frame having a roller circle or race associated therewith, an upper rotatable structure centered with respect to the roller circle or race, front and rear pairs of rollers for supporting the upper structure on the roller circle or race, a bracket for rotatably receiving each roller, and means for connecting the brackets of each pair of rollers to the upper structure in a manner to permit the upper structure to tilt about an axis passing through both rollers of one of said pairs while the rollers of said pair remain in full face contact with the roller circle or race.

7. A roller construction for locomotive and crawler cranes, shovels, and the like, comprising a truck frame having a roller circle or race associated therewith, an upper rotatable structure centered with respect to the roller circle or race, rollers for supporting the upper structure on said circle or race, a hollow bracket for rotatably supporting each roller and for enclosing all but the lower peripheral portion of each roller, and means for pivotally connecting the brackets to the upper structure to permit each bracket to be swung into a position which will allow its roller to be removed from the hollow bracket through the open portion of the same and in a radially outward direction over the periphery of the roller circle or race.

8. A roller construction for locomotive and crawler cranes, shovels, and the like, comprising a traction device having associated therewith a roller circle or race provided with a beveled tread face, an upper rotatable structure centered with respect to the roller circle or race, front and rear pairs of conical rollers for supporting the upper structure on the roller circle or race, and means for connecting each pair of rollers to the upper structure in a manner to permit the upper structure to tilt about a common axis passing through both rollers of one of said pairs while the rollers of said pair remain in full face contact with the beveled roller circle or race.

9. A roller construction for locomotive and crawler cranes, shovels, and the like, comprising an upper rotatable structure having a platform or floor frame, a pair of parallel web plates provided in said platform or floor frame, a bracket having trunnions journaled in aligned apertures formed in said web plates, a roller shaft mounted in said bracket with its axis angularly arranged with respect to the axes of said bracket trunnions, and a roller journaled on said roller shaft.

10. A roller construction for locomotive and crawler cranes, shovels, and the like, comprising a truck frame having a roller circle or race associated therewith, an upper rotatable structure centered with respect to the roller circle or race, rollers for supporting the upper structure on said circle or race, brackets mounting the rollers and their shafts, and means for detachably connecting each bracket to the upper structure to permit the brackets to swivel in pairs about common axes extending transversely of the upper structure to vary the angular relationship of the roller axes relative to the horizontal plane of the upper structure.

11. A roller construction for locomotive and crawler cranes, shovels, and the like, comprising a truck frame having a roller circle or race associated therewith, an upper rotatable structure centered with respect to the roller circle or race, rollers for supporting the upper structure on said circle or race, brackets mounting the rollers and their shafts, means for detachably connecting the brackets to the upper structure to permit the brackets to swivel to vary the angular relationship of the roller axes relative to the horizontal plane of the upper structure, and means to retain said brackets against unintentional disconnection from the upper structure and to limit swiveling movement of said brackets.

12. A roller construction for locomotive and crawler cranes, shovels, and the like, comprising an upper rotatable structure having a platform or floor frame, a pair of parallel web plates provided in said platform or floor frame and having axially aligned bearing apertures formed therein with an entrance opening for each bearing aperture cut through an edge of its web plate, a bracket having trunnions journaled in the aligned bearing apertures formed in said web plates, each of said trunnions having a flat side to provide the trunnion with a minor diameter which is less than the width of the entrance opening for its bearing aperture whereby the bracket trunnions may be inserted in said bearing apertures through said entrance openings and then turned about their axes to retain the trunnions in their bearing apertures, means for limiting swiveling movement of the bracket relative to the web plates to prevent unintentional passage of its trunnions through said entrance openings, a roller shaft mounted in said bracket with its axis angularly arranged with respect to the axes of said bracket trunnions, and a roller journaled on said roller shaft.

13. A roller construction for locomotive and crawler cranes, shovels, and the like, comprising a truck frame having a roller circle or race associated therewith, an upper rotatable structure centered with respect to the roller circle or race, rollers for supporting the upper structure on said circle or race, brackets mounting the rollers and their shafts, a pair of axially aligned trunnions carried by each bracket with their axes arranged at an angle to the axis of the roller shaft, and bearings carried by the upper rotatable structure for receiving the trunnions of all of the brackets and for positioning all of the trunnions with their axes extending transversely of the upper structure.

14. A roller construction for locomotive and crawler cranes, shovels, and the like, comprising a truck frame having a roller circle or race associated therewith, an upper rotatable structure centered with respect to the roller circle or race, front and rear pairs of rollers for supporting the upper structure on said circle or race, a shaft for each roller, a bracket for each roller and its shaft, and means for connecting the brackets to the upper structure in such a manner that the rollers of each pair and their shafts and brackets may swivel as a unit about a common axis, said means comprising a pair of axially aligned trunnions carried by each bracket, and bearing apertures formed in the upper structure to receive said trunnions.

15. A roller construction for locomotive or crawler cranes, shovels, and the like, comprising a truck frame having a roller circle or race associated therewith, an upper rotatable structure centered with respect to the roller circle or race, front and rear pairs of rollers for supporting the upper structure on the roller circle or race, a bracket for rotatably receiving each roller, and means for connecting the brackets of each pair of rollers to the upper structure in a manner to permit the upper structure to tilt about a common axis passing through both rollers of one of said pairs while the rollers of said pair remain in full face contact with the roller circle or race, said means comprising a pair of axially aligned trunnions carried by each bracket, and bearing apertures formed in the upper structure to receive said trunnions.

16. A roller construction for locomotive and crawler cranes, shovels, and the like, comprising an upper rotatable structure having a platform or floor frame, a pair of parallel web plates provided in said platform or floor frame and having axially aligned bearing apertures formed therein with an entrance opening for each bearing aperture cut through an edge of its web plate, a bracket having trunnions journalled in the aligned bearing apertures formed in said web plates, each of said trunnions having a flat side to provide the trunnion with a minor diameter which is less than the width of the entrance opening for its bearing aperture whereby the bracket trunnions may be inserted in said bearing apertures through said entrance openings and then turned about their axes to retain the trunnions in their bearing apertures, a lock plate for each bracket secured to the upper structure and having a head positioned in the entrance opening of one of the bearing apertures and cooperating with the flat side of the associated bracket trunnion to limit swiveling movement of the bracket relative to the web plate to prevent unintentional passage of its trunnions through said entrance openings.

17. A roller construction for locomotive and crawler cranes, shovels, and the like, comprising a truck frame, an upper structure rotatable with respect to said frame, rollers for supporting the upper structure on said frame, and means for attaching each roller to the upper structure in a manner to permit the roller to swivel about an axis which is angularly arranged with respect to the roller axis and to be quickly detached from said upper structure, said means comprising a pair of bearing members associated with the upper structure and having axially aligned bearing structures formed therein with a restricted entrance opening for each aperture, and a bracket rotatably supporting a roller and having trunnions journaled in the aligned bearing apertures, each of said trunnions being shaped to provide a minor diameter which is less than the width of the entrance opening for its aperture, whereby the trunnions may be inserted in said apertures through said entrance openings and then turned about their axes to mis-align their minor diameters with the entrance openings.

18. A roller construction for locomotive and crawler cranes, shovels, and the like, comprising a rotatable platform, a roller assembly for supporting said platform, and means for attaching the roller assembly to the upper structure to permit the said assembly to swivel as a unit about an axis which is angularly arranged with respect to the roller axis and to be quickly detached from said platform, said means comprising a pair of bearing members associated with the upper structure and having axially aligned bearing apertures formed therein with a restricted entrance opening for each aperture, a bracket rotatably supporting the roller and having trunnions journaled in the aligned bearing apertures, each of said trunnions being shaped to provide a minor diameter which is less than the width of the entrance opening for its aperture, whereby the trunnions may be inserted in said apertures through said entrance openings and then turned about their axes to present their major diameters to said entrance openings, and means for closing the entrance opening for one of said apertures after positioning the trunnions in the apertures.

19. A roller construction for locomotive and crawler cranes, shovels, and the like, comprising a truck frame having associated therewith a roller circle or race, an upper rotatable structure centered with respect to the roller circle or race, a plurality of rollers for supporting the upper structure on said circle or race, each of said rollers having its axis of rotation extending radially of said circle or race, a load manipulating device in the nature of a boom mounted on said upper structure and projecting radially outwardly of said circle or race, whereby manipulation of an exceedingly heavy load by said device will result in displacement of the center of gravity of the upper structure radially outwardly of the roller circle or race, and means for connecting all of said rollers to the upper structure to permit the rollers to swivel relative to the upper structure about axes extending transversely of the upper structure and at right angles to the length of said boom while their axes of rotation remain extending radially of said circle or race.

HILMER N. EKBOM.
EDWARD KORENSKY.